(12) United States Patent
Bausenwein et al.

(10) Patent No.: US 8,102,589 B2
(45) Date of Patent: Jan. 24, 2012

(54) SUPERPOSITION SYSTEM COMPRISING MICRO ELECTRO MECHANICAL SYSTEMS

(76) Inventors: Bernhard Rudolf Bausenwein, Hagelstadt (DE); Max Mayer, Forchheim (DE)

( * ) Notice: Subject to any disclaimer, the term of this patent is extended or adjusted under 35 U.S.C. 154(b) by 783 days.

(21) Appl. No.: 11/716,649

(22) Filed: Mar. 12, 2007

(65) Prior Publication Data

US 2007/0171533 A1    Jul. 26, 2007

Related U.S. Application Data

(63) Continuation-in-part of application No. 11/017,916, filed on Dec. 22, 2004, now Pat. No. 7,403,320.

(30) Foreign Application Priority Data

Dec. 29, 2003  (DE) .................................. 103 61 915

(51) Int. Cl.
    *G02B 26/00*    (2006.01)
(52) U.S. Cl. ....................................... 359/290; 359/291

(58) Field of Classification Search .................. 359/290, 359/291
See application file for complete search history.

(56) References Cited

U.S. PATENT DOCUMENTS

| | | |
|---|---|---|
| 5,600,383 A | 2/1997 | Hornbeck |
| 5,638,142 A | 6/1997 | Kavanagh et al. |
| 5,921,650 A | 7/1999 | Doany et al. |
| 6,250,763 B1 | 6/2001 | Fielding et al. |
| 6,631,993 B2 * | 10/2003 | Fielding ........................ 353/31 |

* cited by examiner

*Primary Examiner* — Ricky L Mack
*Assistant Examiner* — James C Jones

(57) ABSTRACT

The superposition system with micro electromechanical systems (MEMS, e.g. DMDs from Texas Instruments) superposes the "ON"-lights of two MEMSs. More specifically, the invention relates to the chirality (handedness) of MEMS and the geometric problems associated with this handedness for superposition systems. In this application we uncover a solution to superpose the images modulated by two MEMSs using an exchange of columns and rows in one of the addressing matrices.

17 Claims, 5 Drawing Sheets

SUPERPOSITION SYSTEM COMPRISING MICRO ELECTRO MECHANICAL SYSTEMS

RELATED APPLICATION

This application is a continuation in part of application Ser. No. 11/017,916, entitled "2-Channel display system comprising micro electro mechanical systems" filed on Dec. 22, 2004 now U.S. Pat. No. 7,403,320, which is incorporated herein in its entirety by reference.

CROSS-REFERENCE TO RELATED APPLICATIONS

2-Channel Display System Comprising Micro Electro Mechanical Systems U.S. Ser. No. 11/017,916

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention uncovers a system to superpose the modulated "ON"-lights of stereo-isomeric micro electro mechanical systems (MEMS). The invention relates to display and projection systems using MEMS as image modulators. More specifically, the invention relates to the chirality (handedness) of deflectable micro mirror devices (DMD) and uncovers solutions for some of the geometric problems associated with this handedness.

These geometric problems result from the physical layout of DMDs, which have their single deflectable mirrors rotated on a mirror deflection axis (MDA), which is the diagonal of single deflectable mirrors, for various physical reasons (U.S. Pat. No. 5,600,383). As a consequence, the MDAs are rotated 45 degrees with respect to the modulators mirror array (FIG. 1). While this usually has no consequence for the modulated "ON"-beam (because it is reflected normal to the chip surface in the most common use according to the state of the art), it introduces spatial consequences for the guidance of the unmodulated "IN"-beam. The overall system is thus a stereo-isomer. In systems with several superposed MEMSs (U.S. Pat. No. 5,638,142, U.S. Pat. No. 6,250,763) this problem is overcome by using a second reflective surface in addition to the single surface which is used for splitting the "IN"-beam and combining the modulated "ON"-beam.

In contrast, in our related application and in this application we focus on solutions which allow the system designers to superpose the MEMSs without the use of a second reflexion.

BRIEF SUMMARY OF THE INVENTION

This is a continuation in part of our application Ser. No. 11/017,916. It focuses on a embodiment displayed in FIG. 8 of the related application (which is identical to FIG. 3 of this application). In this superposition arrangement, two imagers of the same stereo-isomer topology (e.g. "L"-type according to FIG. 1, which is readily available) were used to yield superposition of images that were displayed in a partial field of the modulator arrays. While this usually results in a loss of resolution of the superposition image (compared to the resolution of the imagers used), this loss depends on the dimension (format) of the two modulator arrays on the two imagers. On the other hand, one gains an important advantage, in that the light architecture (especially for the "IN"-light) may be used as in a perfectly symmetrical setup with both stereo-isomeric counterparts. This simplifies the system architecture significantly.

DETAILED DESCRIPTION OF THE INVENTION

Figure 1A:
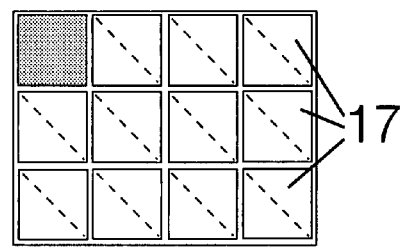
FIG. 1 shows the stereo-isomeric topology of MEMS according to the state of the art ("L" and "R"-type according to our nomenclature).

Figures are labeled in a way that identical numbers indicate identical components in all figures. MEMS 1 (1); MEMS 2 (2); TIR 1 (3); TIR 2 (4); superposition layer 2 (6); reflexion surface (8); incident "IN"-beam (11); superposed modulated beam (12); channel 1 (13); channel 2 (14); single deflectable mirror (17); mirror deflection axis MDA (21); superimposed image (22).

Figure 1B:
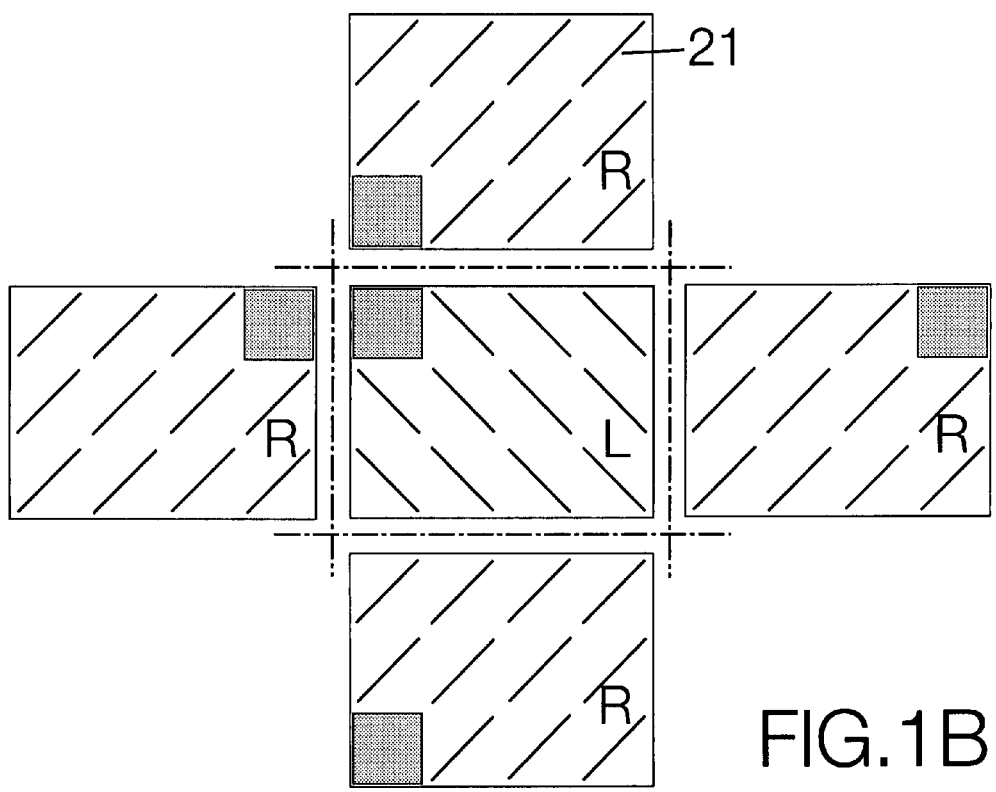

FIG. 1A shows schematically a MEMS in the form of the recently available Digital Mirror Device (DMD, by Texas Instruments). It consists of a rectangular array of single deflectable mirrors (17). Stippled lines indicate the axis of deflection of the single mirrors, which are a diagonal of each mirror. Dependent on the two stable states, each mirror can be used to direct an incident "IN"-beam either into the modulated "ON"-beam (bright pixels) or into an "OFF"-beam at dark pixels (beams not shown, see our related application). FIG. 1B shows the recently available type in the center. Due to the rectangular shape of the MEMS and the rotation of the mirror deflection axis (21, FIG. 1B) by 45 degrees, the DMD in its overall operation is a stereo-isomeric device. We have termed the currently available topology "type L". A reflexion by a given mirror axis (only horizontal and vertical mirror axes shown) transforms the DMD into its stereo-isomeric counterpart, which we call "type R". A stereo-isomer cannot be transformed into its counterpart by rotation.

Figure 2:
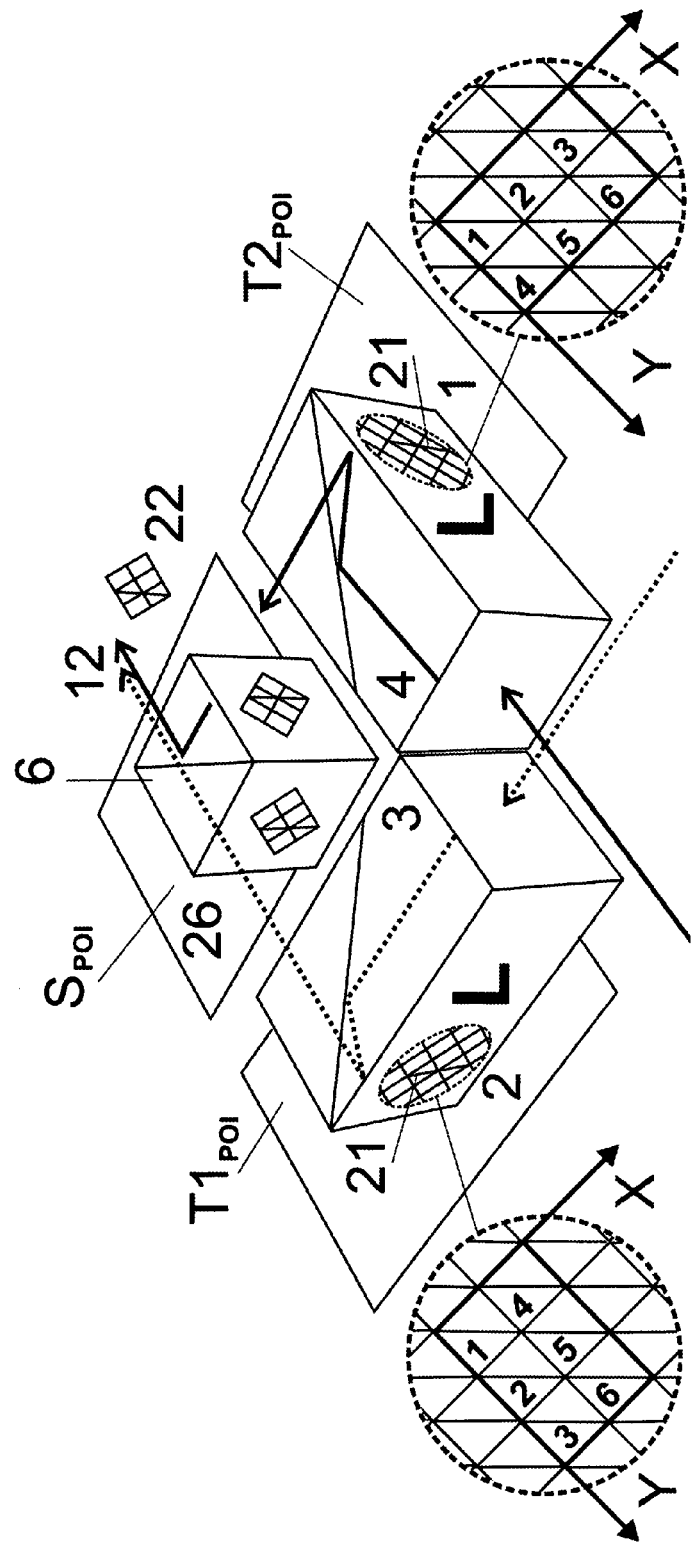
FIG. 2 shows the operational principle of the solution focused on in this application, a solution to superpose the modulated images of 2 stereo-isomeric MEMSs of the same isomer topology type.
Figure 3:
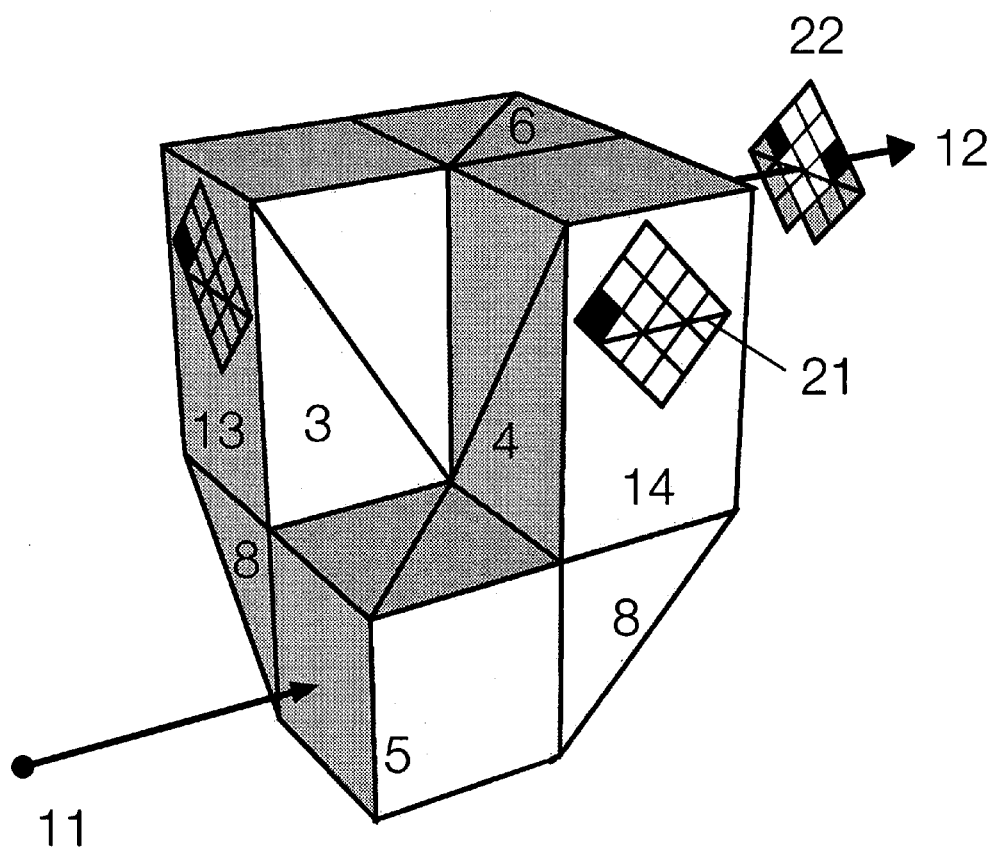
FIG. 3 shows a first embodiment of the invention, an arrangement of beam splitters and TIRs with symmetric light paths and two MEMS of only one topology, and the superposition image covering a part of the mirror arrays of the two MEMSs.

FIG. 2 shows the operational principle of the superposition system with MEMSs according to the embodiment of this application. The "ON"-beams of two MEMSs (1, 2) of the same stereo-isomeric type (e.g. "L"-type) are superposed by a superposition system (6) without an additional reflexion of one of the "ON"-beams. To achieve superposition in this setup, the modulators are addressed in a way which is specific for our invention: columns and rows of the addressing matrices of one of the modulators have to be exchanged. (This is equivalent to addressing one of the MEMS with a mirror image rotated by 90°). The addressing scheme is explained in more detail in FIGS. 4 and 5. FIG. 2 shows a rather simple arrangement, with two TIRs (3,4) used to guide the light to and fro the MEMSs. Here, all planes of incidence ($T1_{POI}$, $T2_{POI}$, and $S_{POI}$ 26) are coplanar. The two beams to be superposed, indicated by dotted and solid lines, may be derived from a single beam, as is shown in FIG. 3. The mirror deflection axes (MDA, 21) of the MEMSs are, virtually projected into the superposition image (22), parallel to each other.

FIG. 3 shows an exemplary superposition system according to our invention. Two "L"-MEMSs are used in an arrangement that has been described in the related application Ser. No. 11/017,916 for the use of a pair of stereo-isomeric MEMSs. A first beam splitter (5) is used to split the incoming beam into two beams. The splitter may have polarizing specificity, but could also split colors or other characteristics of the incident beam (11). These beams are then reflected by two reflective surfaces (8) to two TIRs (3, 4). These TIRs guide the unmodulated beams to the two MEMSs (1, 2). The modulated "ON"-beams of the MEMSs are directed to the superposition surface (6). This superposition system (6) will usually have split/combine characteristics similar to the split system (5). The superposition surface directly, and without an additional reflection for one of the two channels to be superposed (13, 14), superposes the modulated "ON"-beams of the identical MEMSs (in FIG. 3, both MEMSs are not only of the same stereo-isomer type (e.g. "L"), but are also identical in their format, that is have the identical number of rows and columns of single mirrors). In the superposition beam (12), the two mirror arrays of MEMS1 and MEMS2 only partially overlap in the superposition image (22). Only the overlapping regions of the modulator arrays may be addressed. The degree of overlap (or the loss of non-overlapping pixels) is strongly dependent on the format of the two image modulators, as will be shown in FIG. 4 and especially FIG. 5. Due to the folded structure ("folded wing", compare FIG. 2, which shows a planar arrangement), where the planes of incidence of both TIRs ($TIR_{POIs}$) are perpendicular to the plane of incidence of the superposition system ($S_{POI}$), the mirror deflection axes (MDA) are parallel to $S_{POI}$. In FIG. 2, however, MDAs are perpendicular to $S_{POI}$. Other angles with $S_{POI}$ are possible dependent on how $TIR_{POIs}$ are chosen. However, in all arrangements according to our invention, the virtually projected MDAs (21) of the two MEMSs are parallel in the superposition image (22).

Figure 4:
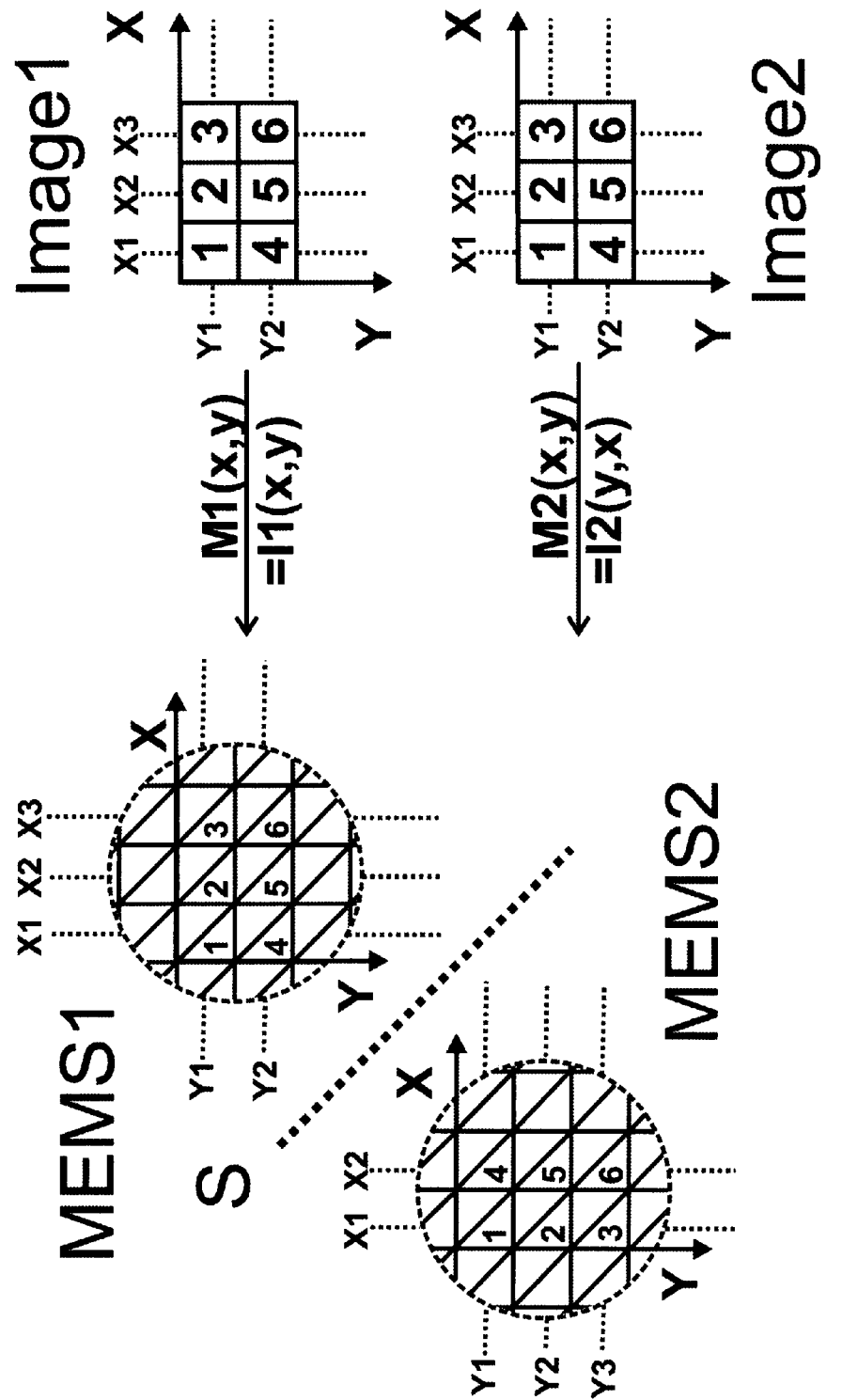
FIG. 4 shows the addressing of image information to be superposed on modulator mirror arrays of two identical MEMS, which includes an exchange of row and column addressing in one of the MEMS.

FIG. 4 shows the addressing scheme that is required for superposition in our invention. The two image arrays (I1 and I2, representing Image1 and Image2) are differently mapped to the deflectable mirror arrays (M1, M2) of the two MEMSs (MEMS1, MEMS2). The stippled line S can be imagined as an axis of symmetry between the two deflectable mirror arrays M1 and M2, the "ON"-beams of which are to be superposed. If both stereo-isomeric counterparts were to be used as in the related application, the two MEMSs would be mirror-symmetric, including x- and y-axes of their coordinate systems. Here, both MEMSs are of the same stereo-isomer topological type. Nevertheless, they are suited to overlap a certain array of mirrors (M1 and M2) when rows (y-coordinate) and columns (x-coordinate) of exactly one of the modulators (here M2) are exchanged in the addressing scheme. While the pixels of one of the images (here Image1) are directly mapped to deflectable mirror array M1(M1(x,y)=I1(x,y)), the second image (here Image2) is mapped with a column-row exchange scheme (M2(x,y)=I2(y,x)). This addressing scheme is specific to the superposition method of our invention. "IN"-beams (as can be seen by the mirror deflection axes) can be kept symmetrical, as with a pair of true stereo-isomeric counterparts. The addressing scheme of MEMS2 is equivalent of addressing a mirror-image of Image2, rotated by 90°.

Figure 5:
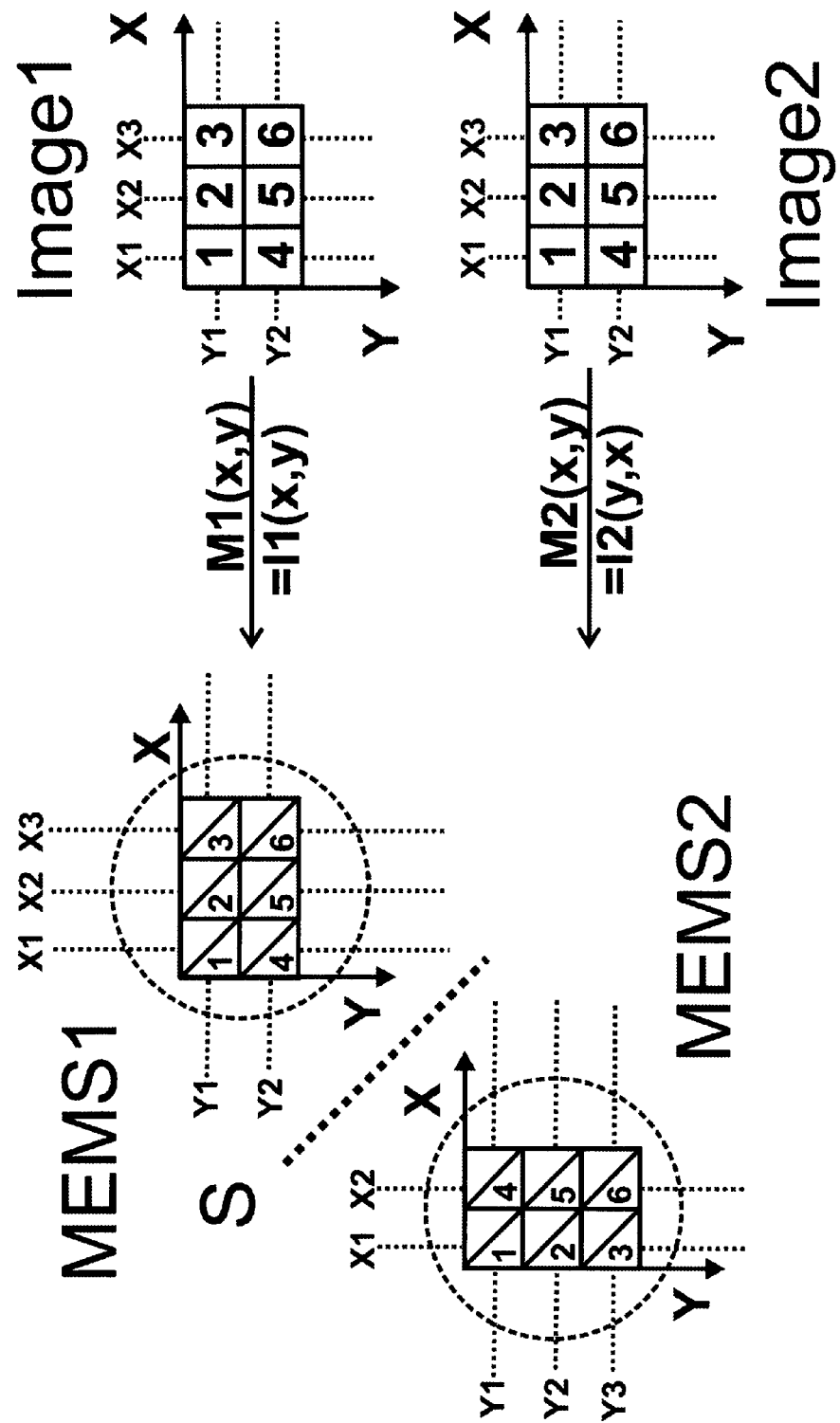
FIG. 5 shows the superposition of the "ON"-beams of a landscape-formatted MEMS and a portrait-formatted MEMS resulting in a complete overlap of the modulator fields after row and column address exchange.

FIG. 5 shows the optimal format of two L-MEMSs to be superposed according to our invention. It has been stated earlier that the degree of overlap on two MEMSs of the same topological type depends on the physical dimension of the modulators deflectable mirror array. While in FIG. 4 the mirror arrays of the two MEMSs to be superposed are a subset of the MEMS total modulator array, in FIG. 5 two MEMSs are superposed which are formatted to yield 100% overlap of their modulator field. Following the row-column exchange scheme explained in FIG. 4, the optimum overlap of the modulators is found when one of the MEMSs is landscape-formatted and the second is portrait-formatted, and the numbers of rows of one MEMS equals the number of columns of the second, and vice versa). When the row-column exchange is applied in one MEMS (M2(x,y)=I2(y,x)), the superposition is total. This situation is hardly discriminable from the employment of true stereo-isomers, but for the addressing mode.

It will be appreciated that whilst this invention is described by way of detailed embodiments, these realizations serve as illustrations of the invention but not as a limitation of the invention; numerous variations in form and detail can be deduced by those skilled in the art or science to which the invention pertains without leaving the scope of the invention as defined by the following claims:

The invention claimed is:

1. A superposition system, comprising two spatially separate channels feeding two images into a common light path;

light of at least one light source feeding the two channels;

spatial light modulators of the Micro Electro Mechanical System type, at least one in each channel, characterized by modulating light via the direction of the reflection of the incident light beam;

each spatial light modulator comprising an array of deflectable mirrors;

each spatial light modulator having stereo-isomeric structure and showing functional handedness, characterized by their deflectable mirrors having mirror deflection axes (MDAs) which are not parallel to a symmetry axis of their mirror arrays;

the mirror arrays of each spatial light modulator being characterized by having columns which are distinguishable from their rows with respect to structural properties of the spatial light modulator, the columns being referenced by a first and the rows being referenced by a second address index, such that the single mirrors can be addressed as M[column;row];

said spatial light modulators being positioned such that the axis of the incident light beam differs from the axis of the modulated ON-light beam, the modulated ON-light beam being reflected normally to the surface of the spatial light modulator;

a superposition layer (S), with a plane of incidence ($S_{POI}$), for superimposing the two spatially modulated ON-light beams of each channel into a common ON-light beam;

a first spatial light modulator (MEMS1) in one of the channels;

a first mirror area (M1) to be superposed, situated on the at least M columns and at least B rows of the mirror array of the first spatial light modulator (MEMS1), and the single mirrors of the first mirror area being addressable as M1[m;b], wherein m=1 . . . M, and b=1 . . . B;

a second spatial light modulator (MEMS2) in the second channel;

a second mirror area (M2) to be superposed, situated on the at least B columns and at least M rows of the mirror array of the second spatial light modulator (MEMS2), and the single mirrors of the second mirror area being addressable as M2[b;m];

the ON-light beam of the deflectable mirror in the first mirror area at column m and row b M1[m;b] being superposed with the ON-light beam of the deflectable mirror in the second mirror area at column b and row m M2[b;m].

2. A superposition system according to claim 1,
said first spatial light modulator having a deflectable mirror array of exactly M columns and B rows;
said second spatial light modulator having a deflectable mirror array of exactly B columns and M rows.

3. A superposition system according to claim 1, comprising additional means for folding the light paths in both channels, at least 1 in each channel, additional to the reflection of said spatial light modulators, and additional to the folding in said superposition layer.

4. A superposition system according to claim 3,
said means for folding being total internal reflection prisms, at least a first and a second one, with a first and a second plane of incidence ($T1_{POI}$, $T2_{POI}$).

5. A superposition system according to claim 4, comprising a split layer with split characteristics like the superposition layer (S).

6. A superposition system according to claim 5,
the plane of incidence of the split layer and the plane of incidence of the superposition layer being parallel.

7. A superposition system according to claim 5,
the plane of incidence of the split layer and the plane of incidence of the superposition layer ($S_{POI}$) and the planes of incidence of the first and second total internal reflection prism ($T1_{POI}$, $T2_{POI}$) being orthogonal with respect to their reflection surfaces within the two channels.

8. A superposition system according to claim 5,
the planes of incidence of the split and of the superposition layers and of the first and second total internal reflection prism being all in one plane.

9. A superposition system according to claim 5,
said planes of incidence of the split and superposition layers being parallel planes;
said planes of incidence of the first and second total internal reflection prism ($T1_{POI}$, $T2_{POI}$) being perpendicular;
said plane of incidence of the superposition layer ($S_{POI}$) being perpendicular to the planes of incidence of the first and the second total internal reflection prism ($T1_{POI}$, $T2_{POI}$).

10. A superposition system according to claim 1,
the superposition layer (S) being a polarizing beam splitter.

11. A superposition system according to claim 1,
the superposition layer (S) being a color splitter.

12. A superposition system according to claim 10, comprising a polarization conversion system transforming linearly polarized light into circularly polarized light, one channel comprising left-handed, the other right-handed circular polarization.

13. A superposition system according to claim 10, using polarization correction systems upstream to the superposition.

14. A superposition system according to claim 1, using stereoscopic information to control the spatial light modulators of the two channels.

15. A superposition system according to claim 1, comprising
a body;
one spatial light modulator in each channel;
a projection lens.

16. A superposition system according to claim 1, comprising
a body;
more than one spatial light modulator in each channel;
a projection lens.

17. Superposition method,
using a superposition system according to claim 1 to spatially modulate and superpose two beams.

* * * * *